United States Patent
Toyama

(10) Patent No.: US 12,169,980 B2
(45) Date of Patent: Dec. 17, 2024

(54) INFORMATION PROCESSING SYSTEM, INFORMATION PROCESSING METHOD, AND STORAGE MEDIUM

(71) Applicant: NEC Corporation, Tokyo (JP)

(72) Inventor: Hiroaki Toyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/574,837

(22) PCT Filed: Jul. 5, 2021

(86) PCT No.: PCT/JP2021/025268
§ 371 (c)(1),
(2) Date: Dec. 28, 2023

(87) PCT Pub. No.: WO2023/281563
PCT Pub. Date: Jan. 12, 2023

(65) Prior Publication Data
US 2024/0304026 A1    Sep. 12, 2024

(51) Int. Cl.
*G06V 40/12*    (2022.01)

(52) U.S. Cl.
CPC ...... *G06V 40/1353* (2022.01); *G06V 40/1371* (2022.01)

(58) Field of Classification Search
CPC .................. G06V 40/1353; G06V 40/1371
See application file for complete search history.

(56) References Cited

U.S. PATENT DOCUMENTS

| | | | |
|---|---|---|---|
| 9,626,549 B1* | 4/2017 | Chen | G06V 40/1371 |
| 2005/0232473 A1* | 10/2005 | Liu | G06V 40/1376 382/124 |
| 2007/0031014 A1 | 2/2007 | Soderberg et al. | |
| 2012/0189171 A1 | 7/2012 | Abiko et al. | |
| 2012/0308093 A1* | 12/2012 | Lemma | G06V 40/1371 382/125 |
| 2013/0329967 A1* | 12/2013 | Abiko | G06V 40/12 382/115 |
| 2016/0063298 A1* | 3/2016 | Tuneld | G06V 40/67 348/77 |

(Continued)

FOREIGN PATENT DOCUMENTS

| | | | |
|---|---|---|---|
| JP | 2004-030191 A | | 1/2004 |
| JP | 2009-503721 A | | 1/2009 |

(Continued)

OTHER PUBLICATIONS

International Search Report for PCT Application No. PCT/JP2021/025268, mailed on Sep. 14, 2021.

*Primary Examiner* — Antonio Xavier

(57) ABSTRACT

There is provided an information processing system including an acquisition means for acquiring a feature point extracted from a biometric image including a pattern of a living body, a setting means for setting a first reference point and a second reference point corresponding to different positions of the biometric image, and a calculation means for calculating first position information indicating a relative position of the first reference point with respect to the feature point and second position information indicating a relative position of the second reference point with respect to the feature point.

7 Claims, 16 Drawing Sheets

(56) References Cited

U.S. PATENT DOCUMENTS

| | | | |
|---|---|---|---|
| 2016/0147987 A1* | 5/2016 | Jang | G06V 40/1365 726/19 |
| 2019/0266373 A1 | 8/2019 | Hirokawa | |
| 2019/0266383 A1 | 8/2019 | Toyama et al. | |
| 2020/0074144 A1 | 3/2020 | Yoshimine | |

FOREIGN PATENT DOCUMENTS

| | | | |
|---|---|---|---|
| JP | 2014-232373 A | 12/2014 | |
| JP | 2018-067120 A | 4/2018 | |
| JP | 2020-155159 A | 9/2020 | |
| WO | 2011/052036 A1 | 3/2013 | |
| WO | 2018/207571 A | 3/2020 | |

\* cited by examiner

FIG. 9

| FEATURE AMOUNT NO. | REFERENCE POINT R1 | REFERENCE POINT R2 |
|---|---|---|
| 1 | V11 | V12 |
| ⋮ | ⋮ | ⋮ |

INFORMATION PROCESSING SYSTEM, INFORMATION PROCESSING METHOD, AND STORAGE MEDIUM

This application is a National Stage Entry of PCT/JP2021/025268 filed on Jul. 5, 2021, the contents of all of which are incorporated herein by reference, in their entirety.

TECHNICAL FIELD

This disclosure relates to an information processing system, an information processing method, and a storage medium.

BACKGROUND ART

As an example of the biometric matching technology, there is a technology using a feature of a pattern of a living body such as a fingerprint. PTL 1 discloses a biometric matching technique in which matching is performed using features of arrangement of a plurality of sweat pores on a ridge of skin.

CITATION LIST

Patent Literature

International Publication No. 2018/207571

SUMMARY OF INVENTION

Technical Problem

In the biometric matching as described in PTL 1, feature extraction from a pattern of a living body may be performed. In order to improve the accuracy of biometric matching, there is a demand for a technique capable of performing feature extraction with higher accuracy.

It is an example object of this disclosure to provide the information processing system, an information processing method, and a storage medium capable of performing feature extraction with higher accuracy.

Solution to Problem

According to an aspect of this disclosure, there is provided an information processing system including an acquisition means for acquiring a feature point extracted from a biometric image including a pattern of a living body, a setting means for setting a first reference point and a second reference point corresponding to different positions of the biometric image, and a calculation means for calculating first position information indicating a relative position of the first reference point with respect to the feature point and second position information indicating a relative position of the second reference point with respect to the feature point.

According to another aspect of this disclosure, there is provided an information processing method including acquiring a feature point extracted from a biometric image including a pattern of a living body, setting a first reference point and a second reference point corresponding different positions of the biometric image, and calculating first position information indicating a relative position of the first reference point with respect to the feature point and second position information indicating a relative position of the second reference point with respect to the feature point.

According to another aspect of this disclosure, there is provided a storage medium storing a program for causing a computer to execute an information processing method including acquiring a feature point extracted from a biometric image including a pattern of a living body, setting a first reference point and a second reference point corresponding to different positions of the biometric image, and calculating first position information indicating a relative position of the first reference point with respect to the feature point and second position information indicating a relative position of the second reference point with respect to the feature point.

BRIEF DESCRIPTION OF DRAWINGS

FIG. 9 is a table illustrating an outline of feature amounts acquired by the information processing apparatus according to the second example embodiment.

DESCRIPTION OF EMBODIMENTS

Figure 1:
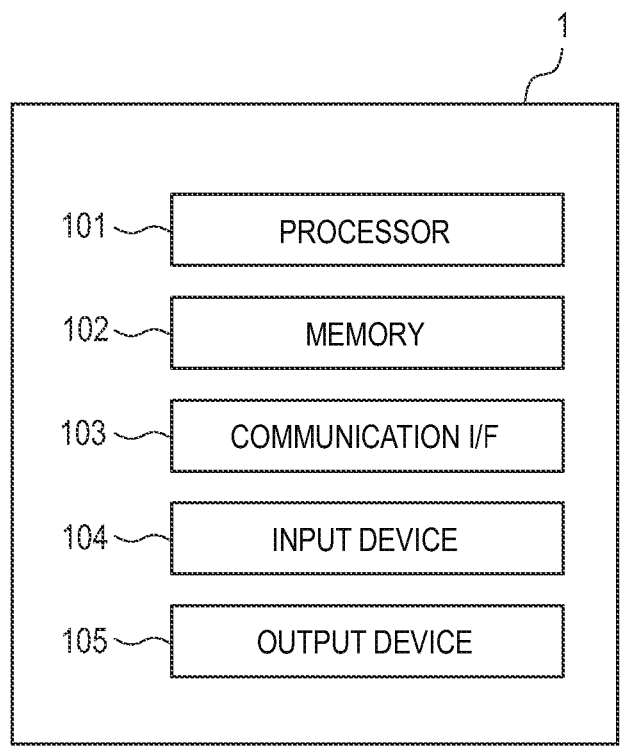
FIG. 1 is a block diagram illustrating a hardware configuration of an information processing apparatus according to a first example embodiment.

Example embodiments of this disclosure will now be described with reference to the accompanying drawings. In the drawings, similar elements or corresponding elements are denoted by the same reference numerals, and description thereof may be omitted or simplified.

First Example Embodiment the information processing apparatus according to a first example embodiment is an apparatus that performs feature extraction from a biometric image including a pattern of a living body. Here, the biometric image may be an image of a finger of a person, a palm of a person, or the like. In addition, the pattern of the living body may be the pattern of the skin such as a fingerprint of a finger or a palm print of a palm. The biometric image may be obtained by photographing a finger of a person, a palm of a person, or the like by a camera, a scanner, or the like, or may be obtained by photographing a pattern or the like latently retained on an object by a camera, a scanner, or the like. The feature amount extracted by the information processing apparatus can be used for biometric matching such as fingerprint matching and palm print matching. The feature extraction processing by the information processing apparatus can be used for both extraction of feature amount of registered person registered in advance and extraction of feature amount of target person acquired at the time of matching.

FIG. 1 is a block diagram illustrating a hardware configuration example of an information processing apparatus 1. The information processing apparatus 1 may be a computer such as a personal computer (PC), a processing server, a smartphone, or a microcomputer. The information processing apparatus 1 includes a processor 101, a memory 102, a communication interface (I/F) 103, an input device 104, and an output device 105. The units of the information processing apparatus 1 are connected to each other via a bus, wiring, a driving device, and the like (not illustrated).

The processor 101 is, for example, a processing device including one or more arithmetic processing circuits such as a CPU (Central Processing Unit), a GPU (Graphics Processing Unit), an FPGA (Field-Programmable Gate Array), an ASIC (Application Specific Integrated Circuit), and a TPU (Tensor Processing Unit). The processor 101 has a function of performing a predetermined operation in accordance with a program stored in the memory 102 or the like and controlling each unit of the information processing apparatus 1.

The memory 102 may include a volatile storage medium that provides a temporary memory area necessary for the operation of the processor 101, and a non-volatile storage medium that non-temporarily stores information such as data to be processed and an operation program of the information processing apparatus 1. Examples of volatile storage media include a RAM (Random Access Memory). Examples of the non-volatile storage medium include a ROM (Read Only Memory), an HDD (Hard Disk Drive), an SSD (Solid State Drive), and a flash memory.

The communication I/F 103 is a communication interface based on standards such as Ethernet (registered trademark), Wi-Fi (registered trademark), Bluetooth (registered trademark), and the like. The communication I/F 103 is a module for communicating with other apparatus such as a data server and an imaging apparatus.

The input device 104 is a keyboard, a pointing device, a button, or the like, and is used by a user to operate the information processing apparatus 1. Examples of the pointing device include a mouse, a trackball, a touch panel, and a pen tablet. The input device 104 may include an imaging device such as a camera or a scanner. These imaging devices can be used to acquire biometric images.

The output device 105 is a device that presents information to a user such as a display device or a speaker. The input device 104 and the output device 105 may be integrally formed as a touch panel.

In FIG. 1, the information processing apparatus 1 is configured by one device, but the configuration of the information processing apparatus 1 is not limited thereto. For example, the information processing apparatus 1 may be the information processing system including more apparatus. Further, the information processing apparatus 1 may be added with other devices or may not be provided with some of the devices. Some devices may be replaced with other devices having similar functions. Further, some functions of the first example embodiment may be provided by another apparatus via a network, or the functions of the first example embodiment may be distributed among a plurality of apparatus. For example, the memory 102 may include cloud storage, which is a storage device provided in another measure. Thus, the hardware configuration of the information processing apparatus 1 can be changed as appropriate.

Figure 2:
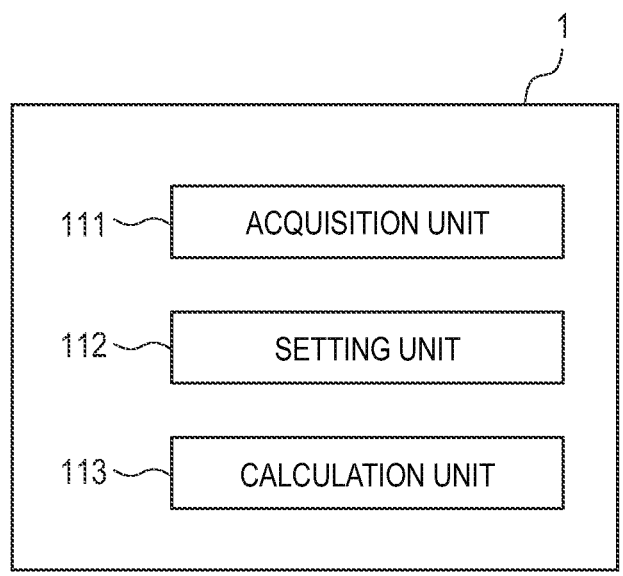
FIG. 2 is a functional block diagram of the information processing apparatus according to the first example embodiment.

FIG. 2 is a functional block diagram of the information processing apparatus 1 according to the first example embodiment. The information processing apparatus 1 includes an acquisition unit 111, a setting unit 112, and a calculation unit 113.

The processor 101 performs predetermined arithmetic processing by performing a program stored in the memory 102. The processor 101 controls the memory 102, the communication I/F 103, the input device 104, and the output device 105 based on the program. Thus, the processor 101 realizes functions of the acquisition unit 111, the setting unit 112, and the calculation unit 113. The acquisition unit 111, the setting unit 112, and the calculation unit 113 may be referred to as an acquisition means, a setting means, a and calculation means, respectively.

Figure 3:
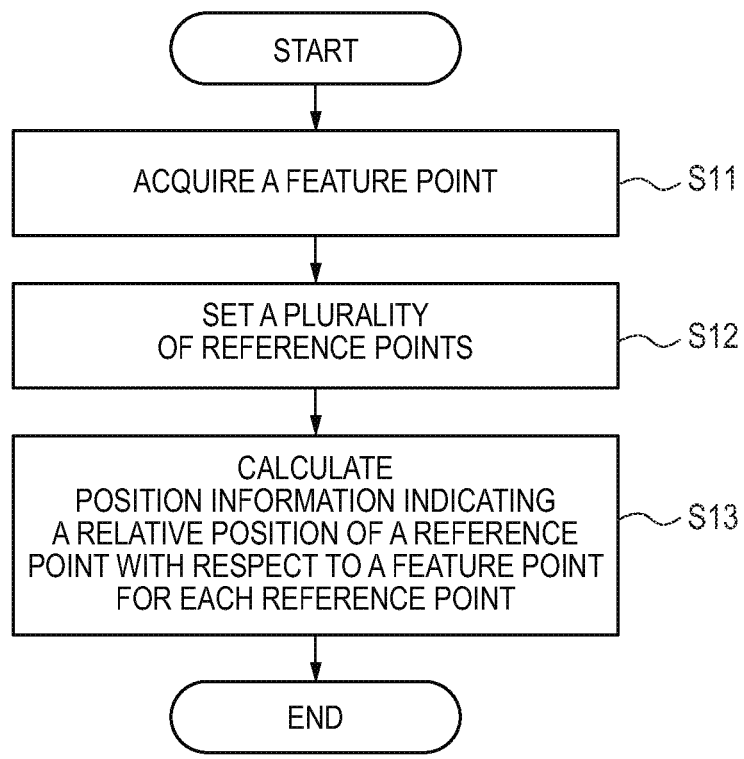
FIG. 3 is a flowchart illustrating an outline of position information calculation processing performed in the information processing apparatus according to the first example embodiment.

FIG. 3 is a flowchart illustrating an outline of position information calculation processing performed in the information processing apparatus 1 according to the first example embodiment. The position information calculation processing of the first example embodiment is started when, for example, a command of the position information calculation processing is issued to the information processing apparatus 1 by a user operation or the like. However, a timing at which the position information calculation processing according to the first example embodiment is performed is not particularly limited, and may be the time at which the information processing apparatus 1 acquires the biometric image or the time at which an instruction to perform the biometric matching is issued.

In step S11, the acquisition unit 111 acquires data of the feature points extracted from the biometric image. The acquisition unit 111 may extract and acquire data of the feature points from a biometric image by performing image processing on the biometric image. Alternatively, the acquisition unit 111 may read and acquire data of the feature points extracted from the biometric image in advance from the memory 102 of the information processing apparatus 1 or an external storage device of the information processing apparatus 1. The data of the feature points acquired in this processing may include information such as coordinates of the feature points in the pixel array of the biometric image and the type of the feature points.

Figure 4:
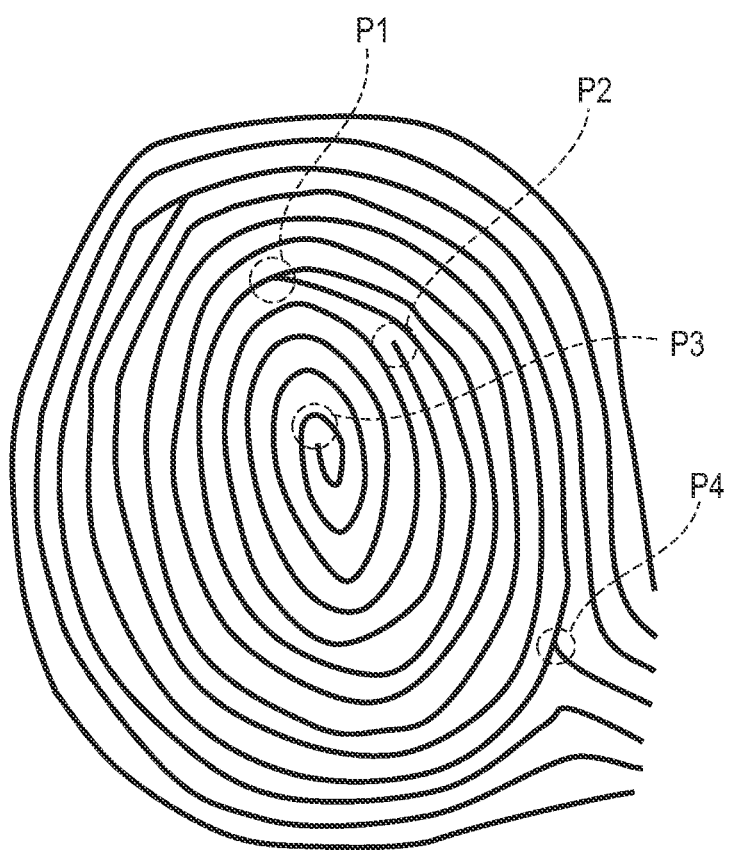
FIG. 4 is a schematic diagram illustrating an example of the feature points of a fingerprint.

An existing image processing technique for a biometric image such as a fingerprint or a palm print can be applied to the feature points extraction in the first example embodiment. One specific example of the feature points applicable to the first example embodiment will be described with reference to FIG. 4. FIG. 4 is a schematic diagram illustrating an example of the feature points of a fingerprint. FIG. 4 schematically illustrates ridges of a fingerprint of a person. FIG. 4 illustrates a bifurcation point P1, a ridge ending point P2, a core point P3, and a delta P4 in the fingerprint image. The bifurcation point P1 is a point where one ridge is branched into two. The ridge ending point P2 is an end of a portion where the ridge is broken. The core point P3 is the center of the pattern of the ridges. The delta P4 is a point where the ridges gather from three directions. These feature points be automatically extracted by processing fingerprint images by a computer. This extraction processing may be performed in the information processing apparatus 1, or may be performed in another apparatus. These feature points may be extracted by an operator manually inputting the positions of the feature points while referring to the image.

In step S12, the setting unit 112 sets a plurality of reference points corresponding to different positions on the biometric image. The plurality of reference points can be set at any position on the biometric image. For example, any one of the feature points as illustrated in FIG. 4 may be a reference point or a point different from these feature points may be a reference point. The reference point is a point serving as a reference for the coordinates on the biometric image and the direction of the coordinate axis on the biometric image. Accordingly, the reference point may include information indicating directions of two coordinate axes and information indicating two-dimensional positions that are origins of these coordinate axes. The two coordinate axes can be set in directions different from the arrangement direction of the pixels of the biometric image. This is because it is desirable that an inclined coordinate axis can be set so that the angle correction can be performed when an inclined finger image of a person or the like is captured. Note that the two coordinate axes may typically be set orthogonal to each other in view of ease of handling data.

In step S13, the calculation unit 113 calculates position information indicating the relative position of the reference point with respect to the feature point for each reference point. This processing will be described in detail with reference to FIG. 5.

Figure 5:
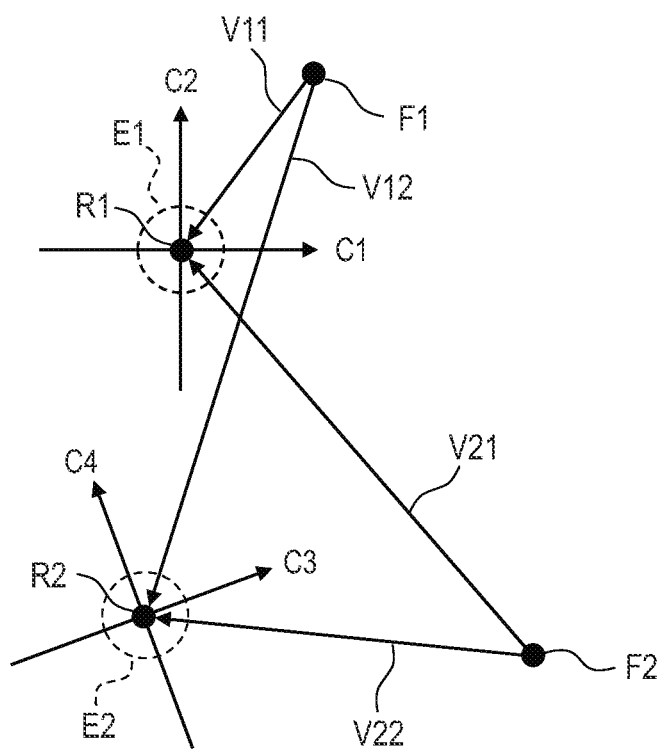
FIG. 5 is a schematic diagram illustrating acquisition of position information according to the first example embodiment.

FIG. 5 is a schematic diagram illustrating acquisition of position information according to the example embodiment. FIG. 5 illustrates the position relationship between two feature points F1 and F2 extracted by the process of step S11 and two reference points R1 and R2 set by the process of step S12. FIG. 5 illustrates two coordinate axes C1 and C2 of the reference point R1 and two coordinate axes C3 and C4 of the reference point R2.

For the feature point F1, position information V11 (first position information) indicating the relative position of the reference point R1 (first reference point) with respect to the feature point F1 and position information V12 (second position information) indicating the relative position of the reference point R2 (second reference point) with respect to the feature point F2 are calculated. Similarly, for the feature point F2, position information V21 indicating the relative position of the reference point R1 with respect to the feature point F2 and position information V22 indicating the relative position of the reference point R2 with respect to the feature point F2 are calculated. Although the two feature points F1 and F2 are illustrated in FIG. 5 and the reference points R1 and R2 are illustrated in FIG. 5, the number of these points is not particularly limited. The number of the feature points may be one or more, and the number of reference points may be two or more.

In FIG. 5, the position information V11, V12, V21, and V22 is illustrated in the form of directed line segments in order to indicate that meaning of having information indicating the distance and the direction from the feature point to the reference point, but the data format of the position information V11, V12, V21, and V22 is not particularly limited.

Figure 6:
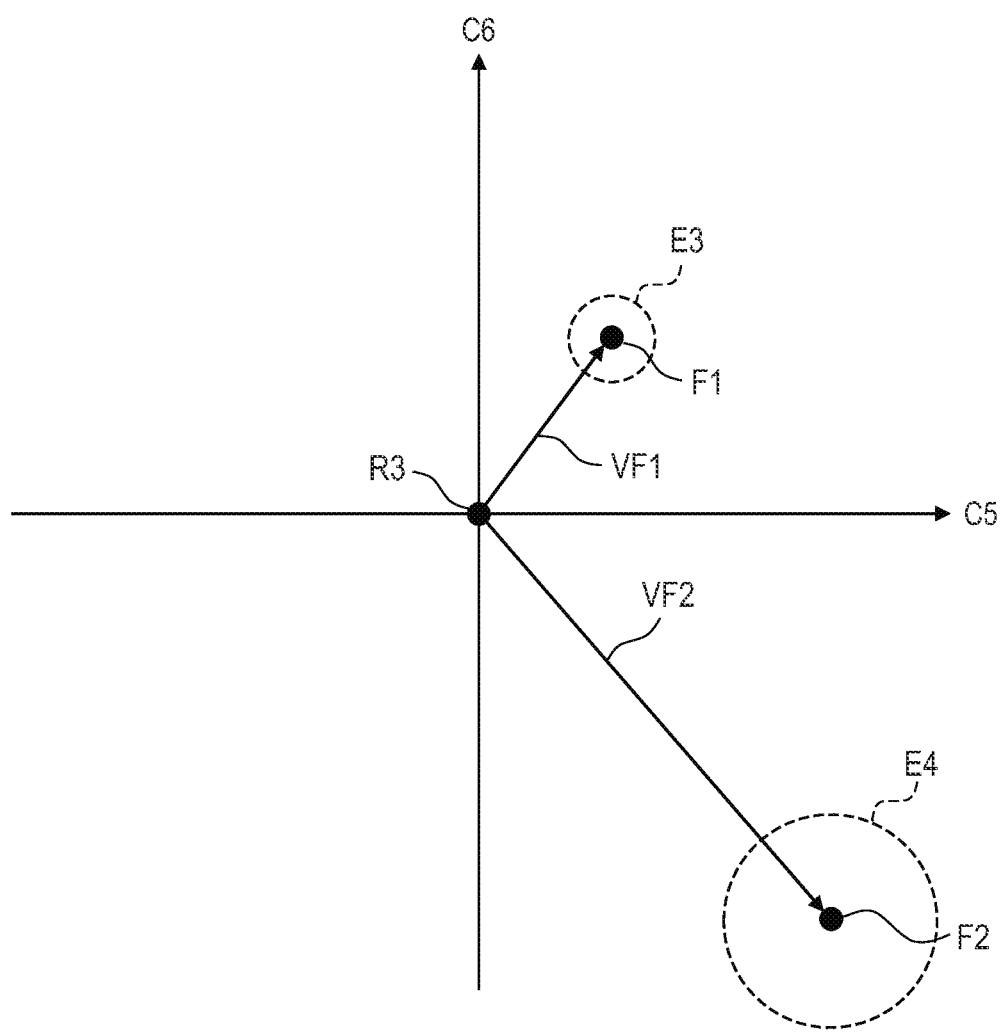
FIG. 6 is a schematic diagram illustrating acquisition of position information according to a comparative example.

The effect of calculating the position information by such a method will be described in comparison with a comparative example of FIG. 6. FIG. 6 is a schematic diagram illustrating acquisition of position information according to the comparative example. FIG. 6 illustrates the position relationship between the two feature points F1 and F2 extracted by the process of step S11 and one reference point R3 set by the process of step S12. FIG. 6 illustrates two coordinate axes C5 and C6 of the reference point R3.

The comparative example of FIG. 6 is an example in which a method of calculating position information is replaced so as to indicate a relative position of a feature point with respect to a reference point in the processing of step S13. In this example, for the feature point F1, position information VF1 indicating the relative position of the feature point F1 with respect to the reference point R3 is calculated. Similarly, for the feature point F2, position information VF2 indicating the relative position of the feature point F2 with respect to the reference point R3 is calculated.

FIG. 6 illustrates error ranges E3 and E4 of the feature points F1 and F2. These error ranges E3 and E4 indicate ranges to be allowed as position errors of the feature points F1 and F2 in the matching using the feature points F1 and F2. Factors for determining the error ranges E3 and E4 include extraction errors of the positions of the feature points F1 and F2, setting error of the position of the reference point R3, and setting errors of the directions of the coordinate axes C5 and C6. Among them, the influence of the setting errors caused by the directions of the coordinate axes C5 and C6 being shifted in the rotation direction is larger as the feature points away from the reference point R3. Therefore, as illustrated in FIG. 6, the error range E4 of the feature point F2 that is farther from the reference point R3 is larger than the error range E3 of the feature point F1 that is closer to the reference point R3. When the error range is large in this way, it is necessary to perform processing in consideration of margins of errors such as setting the threshold value of determination in biometric matching to be low, and thus accuracy of biometric matching may be degraded.

On the other hand, in the example of the first example embodiment illustrated in FIG. 5, the position information V11 and V12 can be set based on the reference points R1 and R2 corresponding to a plurality of different positions for one feature point F1. Thereby, for example, even when one reference point R2 is distant as illustrated in FIG. 5, the position information V11 based on the relatively close reference point R1 can be acquired. As described above, since a plurality of reference points R1 and R2 can be used, even if there is a setting error due to a shift in the rotation direction of the coordinate axis as described above, the error ranges E1 and E2 are not significantly affected by the setting error, and thus the error ranges E1 and E2 are reduced. Therefore, according to the first example embodiment, the information processing apparatus 1 capable of performing feature extraction with higher accuracy is provided.

Second Example Embodiment

Hereinafter, a second example embodiment will be described. In the second example embodiment, as a modified example of the first example embodiment, a method of storing feature amount is exemplified. The description of the same elements as those of the first example embodiment may be omitted or simplified.

Figure 7:
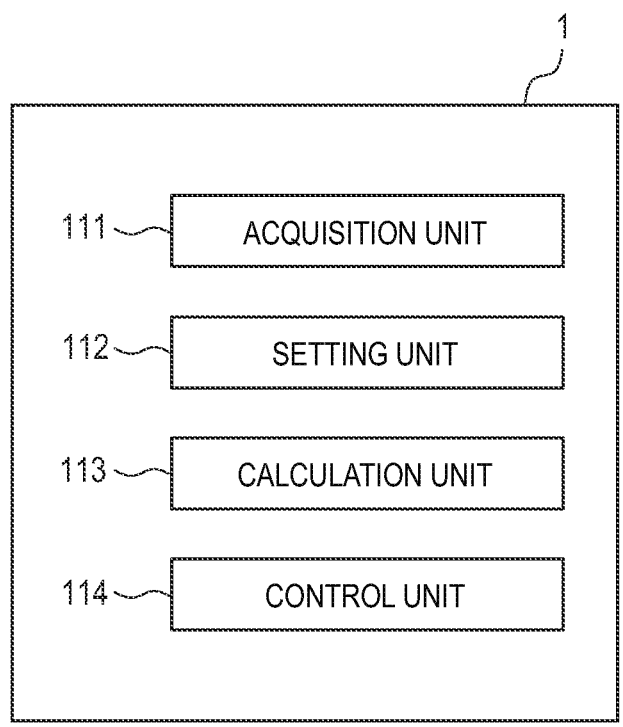
FIG. 7 is a functional block diagram of the information processing apparatus according to a second example embodiment.

FIG. 7 is a functional block diagram of the information processing apparatus 1 according to the second example embodiment. The information processing apparatus 1 further includes a control unit 114.

The processor 101 performs predetermined arithmetic processing by performing a program stored in the memory 102. The processor 101 controls the memory 102, the communication I/F 103, the input device 104, and the output device 105 based on the program. Thus, the processor 101 realizes the function of the control unit 114. The control unit 114 may be more generally referred to as a control means.

Figure 8:
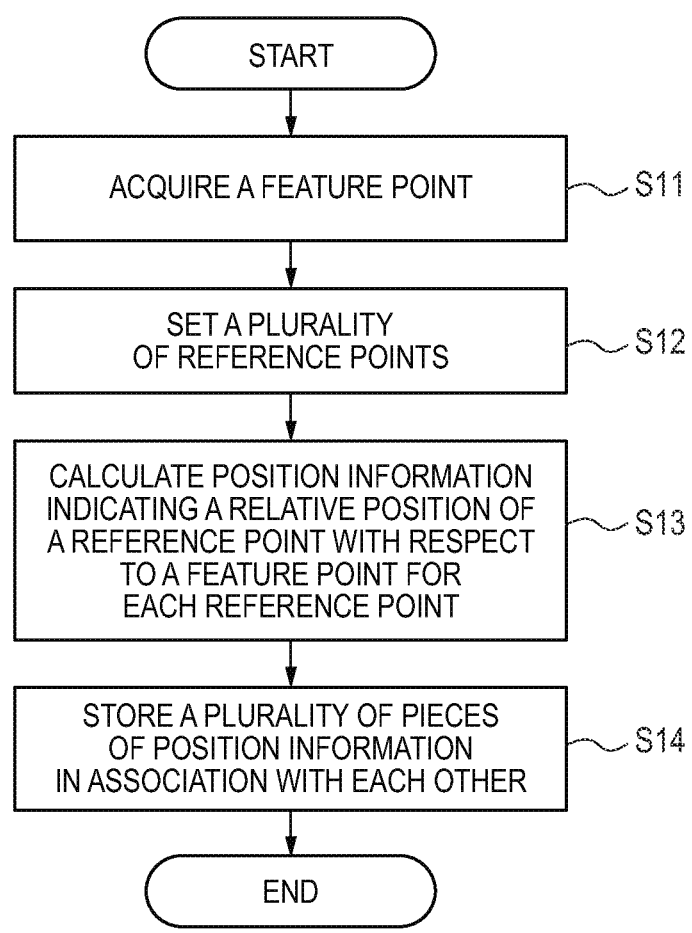
FIG. 8 is a flowchart illustrating an outline of feature amount acquisition processing performed in the information processing apparatus according to the second example embodiment.

FIG. 8 is a flowchart illustrating an outline of feature amount acquisition processing performed in the information processing apparatus 1 according to the second example embodiment. Since the processing in steps S11 to S13 is similar to that in the first example embodiment, the description thereof will be omitted.

In step S14, the control unit 114 stores a plurality of pieces of position information V11 and position information V12 related to the feature point F1 in the storage means in association with each other. The plurality of pieces of position information V11 and the position information V12 are used as feature amounts in biometric matching. Here, the storage means may be, for example, a storage device in the information processing apparatus 1, such as the memory 102 of the information processing apparatus 1, or may be a storage device outside the information processing apparatus 1.

FIG. 9 is a table illustrating an outline of feature amounts acquired by the information processing apparatus 1 according to the second example embodiment. FIG. 9 illustrates an example of feature amounts stored in the storage means in a table format. As illustrated in FIG. 9, two pieces of position information V11 and position information V12 corresponding to one feature point are stored in association with each other. Although the description thereof is omitted in FIG. 9, the position information corresponding to the other feature points may also be stored in association with each other.

According to the second example embodiment, it is possible to provide the information processing apparatus 1 capable of acquiring feature amounts acquired by feature extraction with higher accuracy.

Third Example Embodiment

Hereinafter, a third example embodiment will be described. In the third example embodiment, as a modified example of the first example embodiment, an example of the information processing apparatus 1 having a biometric matching function will be described. The description of the same elements as those of the first example embodiment may be omitted or simplified.

Figure 10:
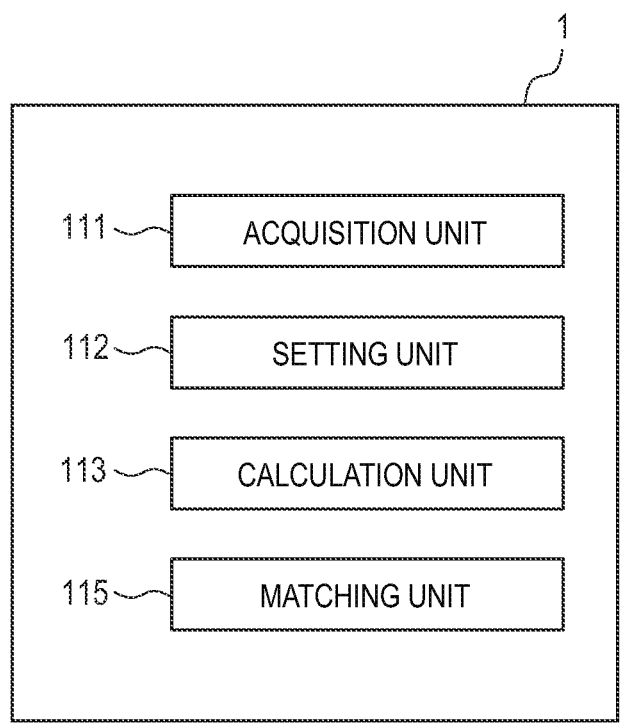
FIG. 10 is a functional block diagram of the information processing apparatus according to a third example embodiment.

FIG. 10 is a functional block diagram of the information processing apparatus 1 according to the third example embodiment. The information processing apparatus 1 further includes a matching unit 115.

The processor 101 performs predetermined arithmetic processing by performing a program stored in the memory 102. The processor 101 controls the memory 102, the communication I/F 103, the input device 104, and the output device 105 based on the program. Thus, the processor 101 realizes the function of the matching unit 115. The matching unit 115 may be referred to as a matching means more generally.

Figure 11:
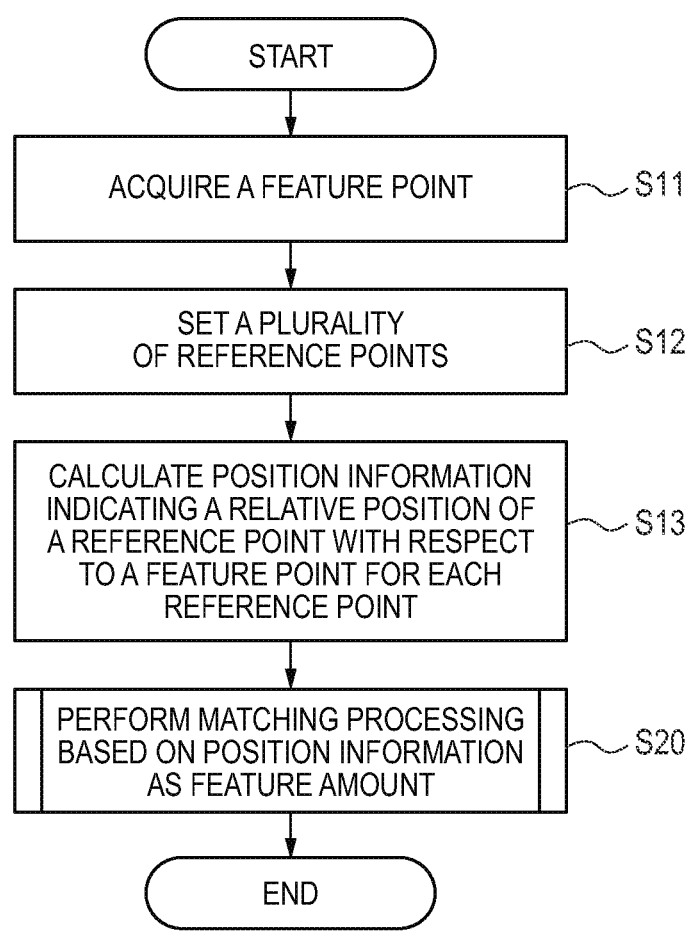
FIG. 11 is a flowchart illustrating an outline of matching processing performed in the information processing apparatus according to the third example embodiment.

FIG. 11 is a flowchart illustrating an outline of the matching processing performed in the information processing apparatus 1 according to the third example embodiment. Since the processing in steps S11 to S13 is similar to that in the first example embodiment, the description thereof will be omitted. The matching processing of the third example embodiment is processing of matching the feature amount of the registered person registered in advance in the storage means or the like with the feature amount of the target person from which the biometric image is acquired in step S11. The matching result is used, for example, to determine whether or not the target person is the same person as the registered person.

In step S20, based on at least one of the plurality of pieces of position information, the matching unit 115 performs biometric matching between the target person from which the biometric image is acquired and the registered person. That is, when two pieces of position information V11 and V12 illustrated in FIG. 5 are used, biometric matching may be performed based on both of the two pieces of position information V11 and V12, or biometric matching may be performed using any one of the two pieces of position information V11 and V12.

According to the third example embodiment, it is possible to provide the information processing apparatus 1 capable of performing the biometric matching with higher accuracy by applying the feature amount extracted with higher accuracy to the biometric matching.

Fourth Example Embodiment

Hereinafter, a fourth example embodiment will be described. In the fourth example embodiment, as a modification of the third example embodiment, an example of the information processing apparatus 1 in which step S20 relating to biometric matching is further embodied will be described. The description of the same elements as those of the third example embodiment may be omitted or simplified.

Figure 12:
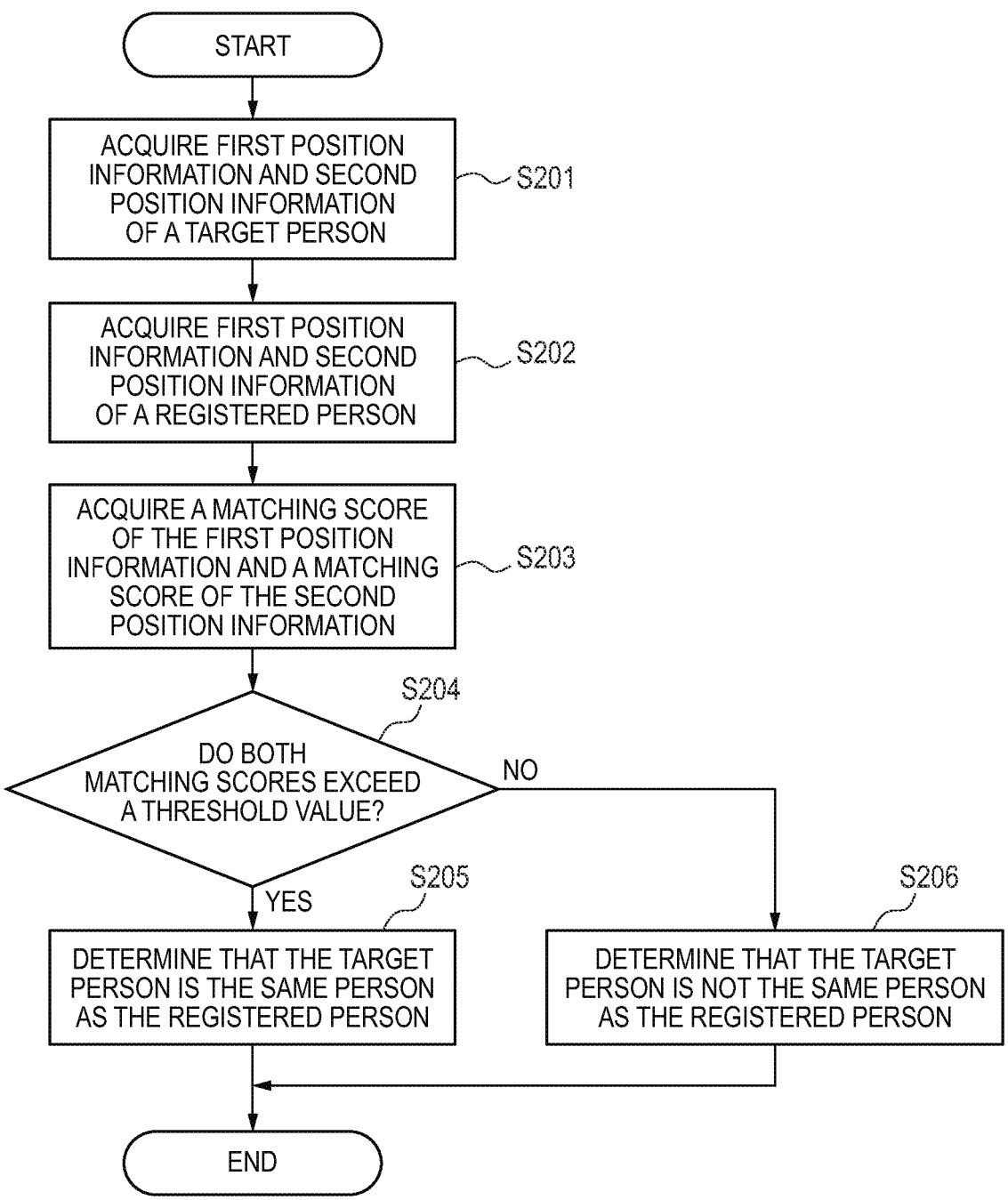
FIG. 12 is a flowchart more specifically illustrating matching processing performed in the information processing apparatus according to a fourth example embodiment.

FIG. 12 is a flowchart more specifically illustrating the matching processing performed in the information processing apparatus 1 according to the fourth example embodiment. The processing illustrated in FIG. 12 is a subroutine corresponding to step S20 of FIG. 11. In the fourth example embodiment, for simplicity of explanation, the number of the plurality of pieces of position information described in the above example embodiment is two, and they are referred to as first position information and second position information, respectively. However, the number of the plurality of pieces of position information is not limited thereto, and may be three or more.

In step S201, the matching unit 115 acquires the first position information of the target person and the second position information of the target person. These correspond to a plurality of pieces of position information acquired in steps S11 to S13 of the above-described example embodiments.

In step S202, the matching unit 115 acquires the first position information of the registered person and the second position information of the registered person. These are acquired in advance from the biometric image of the registered person in the same manner as in steps S11 to S13 of the above-described example embodiments, and are stored in the storage means such as the memory 102.

In step S203, the matching unit 115 generates a matching score by comparing the first position information of the target person with the first position information of the registered person. Further, the matching unit 115 generates a matching score by comparing the second position information of the target person and the second position information of the registered person. In this way, the matching unit 115 acquires the matching score of the first position information and the matching score of the second position information. The matching score is obtained by scoring the comparison result. For example, the matching score indicates the matching degree of the position information (feature amount). In this case, the higher the matching degree of the position information, the higher the matching score, and the lower the matching degree of the position information, the lower the matching score.

In step S204, the matching unit 115 determines whether or not both the matching score of the first position information and the matching score of the second position information exceed a predetermined threshold value. When both the matching score of the first position information and the matching score of the second position information exceed the predetermined threshold value (YES in step S204), the processing proceeds to step S205. When either the matching score of the first position information or the matching score of the second position information does not exceed the predetermined threshold value (NO in step S204), the processing proceeds to step S206.

In step S205, the matching unit 115 determines that the target person is the same person as the registered person. In step S206, the matching unit 115 determines that the target person is not the same person as the registered person.

As described above, in the fourth example embodiment, when both the matching score of the first position information and the matching score of the second position information exceed the predetermined threshold value, it is determined that the target person and the registered person are the same person. In other words, since the logical conjunction of the determination result based on the first position information and the determination result based on the second position information is used for the final determination, more strict determination is performed. This reduces the possibility of erroneously determining that the registered person and the target person are the same person even if the registered person and the target person are different persons, for example, when the first position information accidentally match with each other the second or position information accidentally match with each other.

According to the fourth example embodiment, there is provided the information processing apparatus 1 in which the possibility of erroneously determining different persons as the same person can be reduced.

When the number of the plurality of pieces of position information is three or more, the processing of step S204 may be modified so as to determine whether or not all of the plurality of pieces of position information exceeds the predetermined threshold value.

Fifth Example Embodiment

Hereinafter, a fifth example embodiment will be described. The fifth example embodiment is a modification of the fourth example embodiment, and the determination criteria are changed. The description of the same elements as those of the fourth example embodiment may be omitted or simplified.

Figure 13:
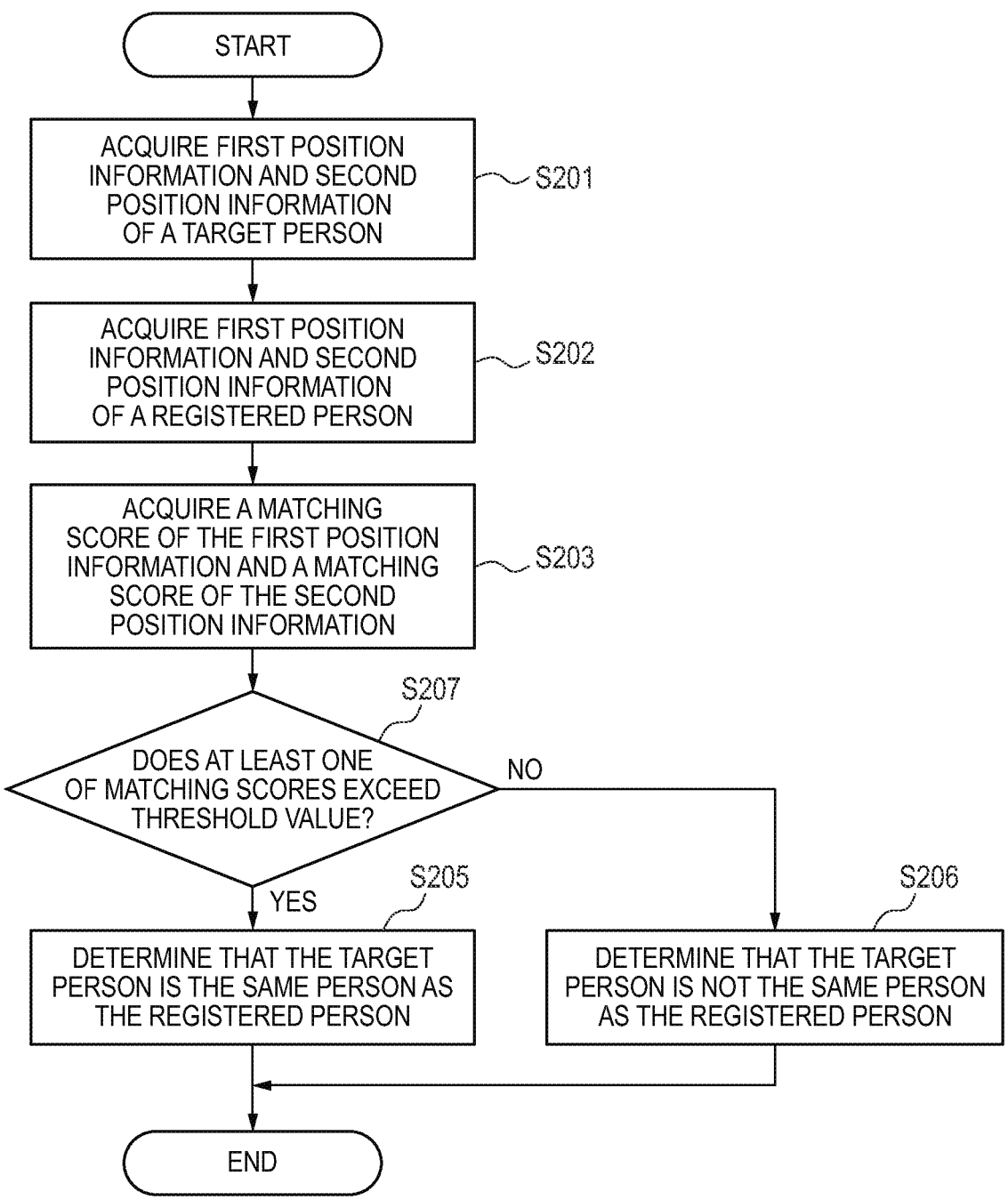
FIG. 13 is a flowchart more specifically illustrating matching processing performed in the information processing apparatus according to a fifth example embodiment.

FIG. 13 is a flowchart more specifically illustrating the matching processing performed in the information processing apparatus 1 according to the fifth example embodiment. In FIG. 13, step S204 in FIG. 12 is replaced with step S207. Since the other steps are the same as those in FIG. 12, the description thereof will be omitted.

In step S207, the matching unit 115 determines whether at least one of the matching score of the first position information and the matching score of the second position information exceeds a predetermined threshold value. When at least one of the matching score of the first position information and the matching score of the second position information exceeds a predetermined threshold value (YES in step S207), the processing proceeds to step S205. When neither the matching score of the first position information nor the matching score of the second position information exceeds a predetermined threshold value (NO in step S207), the processing proceeds to step S206.

As described above, in the fifth example embodiment, when at least one of the matching score of the first position information and the matching score of second position exceeds the information a predetermined threshold value, it is determined that the target person and the registered person are the same. In other words, since the logical disjunction of the determination result based on the first position information and the determination result based on the second position information is used for the final determination, the determination criteria is relaxed. This reduces the possibility of erroneous determination that the registered person and the target person are different persons even if the registered person and the target person are the same person, for example, when there is an error in acquiring the first position information or the second position information.

According to the fifth example embodiment, there is provided the information processing apparatus 1 in which the possibility of erroneously determining the same person as different persons can be reduced.

When the number of the plurality of pieces of position information is three or more, the processing of step S204 may be modified so as to determine whether or not one or more of the plurality of pieces of position information exceeds the predetermined threshold value.

Sixth Example Embodiment

Hereinafter, a sixth example embodiment will be described. The sixth example embodiment is a modification of the fourth example embodiment and the fifth example embodiment, and the determination criteria are changed. The description of the same elements as those of the fourth example embodiment or the fifth example embodiment may be omitted or simplified.

Figure 14:
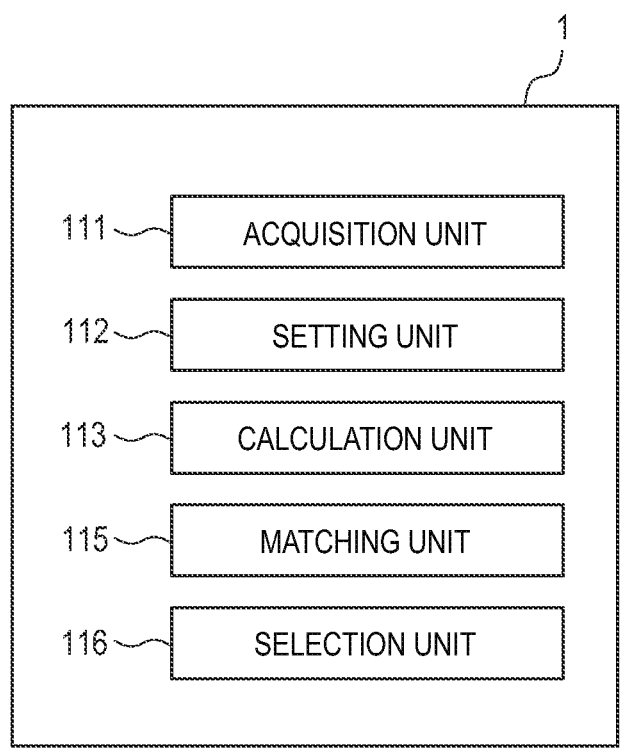
FIG. 14 is a functional block diagram of the information processing apparatus according to a sixth example embodiment.

FIG. 14 is a functional block diagram of the information processing apparatus 1 according to the sixth example embodiment. The information processing apparatus 1 further includes a selection unit 116.

The processor 101 performs predetermined arithmetic processing by performing a program stored in the memory 102. The processor 101 controls the memory 102, the communication I/F 103, the input device 104, and the output device 105 based on the program. Thus, the processor 101 realizes the function of the selection unit 116. The selection unit 116 may be more generally referred to as a selection means.

Figure 15:
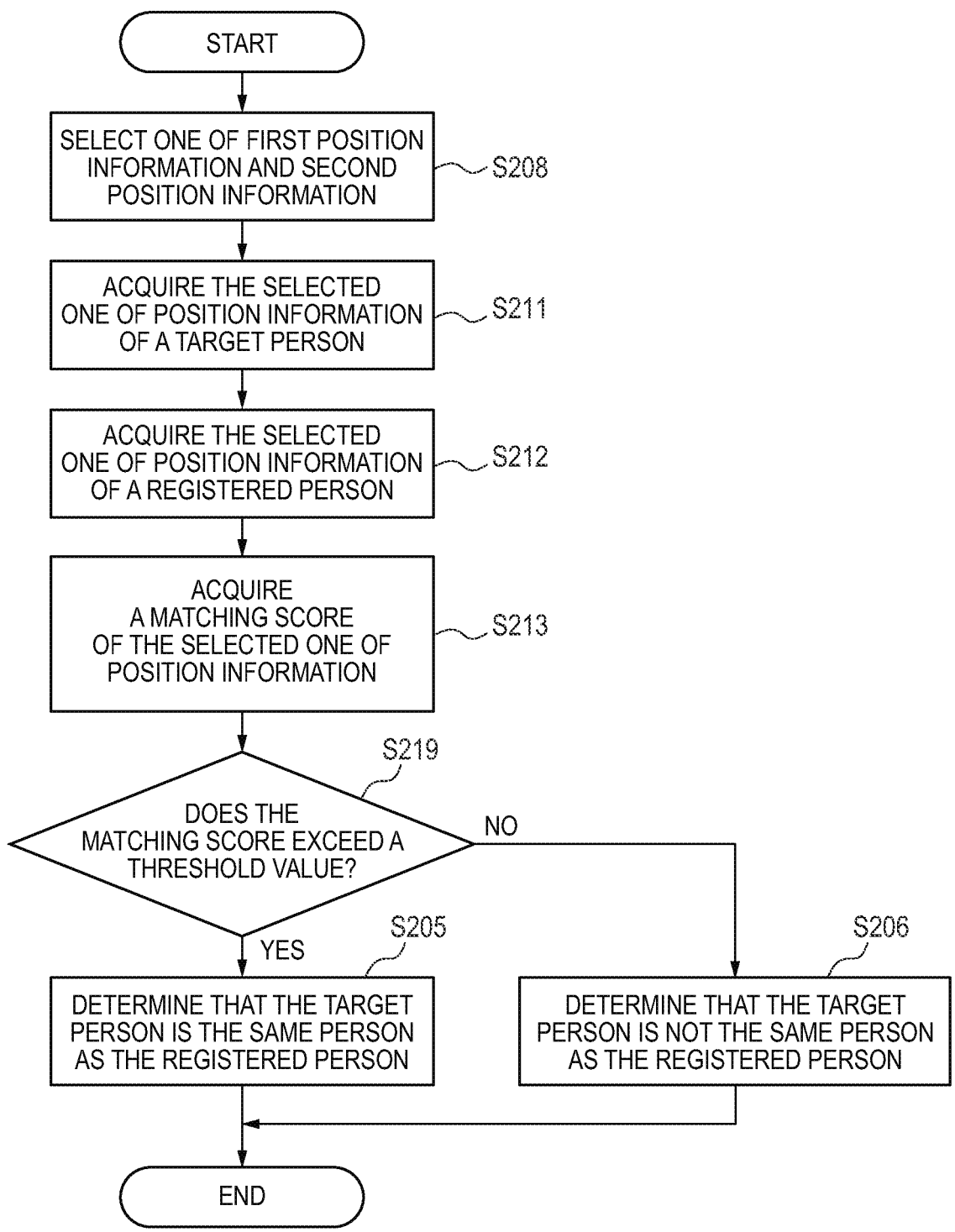
FIG. 15 is a flowchart more specifically illustrating matching processing performed in the information processing apparatus according to the sixth example embodiment.

FIG. 15 flowchart is a more specifically illustrating the matching processing performed in the information processing apparatus 1 according to the fifth example embodiment.

In FIG. 15, steps S201, S202, S203, and S204 in FIG. 12 are replaced with steps S208, S211, S212, S213, and S219. Other steps are the same as those in FIG. 12, and thus description thereof is omitted.

In step S208, the selection unit 116 selects one of the first position information and the second position information based on a predetermined criterion. Information indicating which of the first position information and the second position information is selected is also shared by the matching unit 115.

In step S211, the matching unit 115 acquires the selected one of the first position information of the target person and the second position information of the target person. In step S212, the matching unit 115 acquires the selected of the first position information of the registered person and the second position information of the registered person.

In step S213, the matching unit 115 generate a matching score by comparing the position information of the target person with the position information of the registered person for the selected one of the first position information the and second position information. In this way, the matching unit 115 acquires the matching score of the selected one of the first position information and the second position information.

In step S219, the matching unit 115 determines whether or not the matching score acquired in step S213 exceeds a predetermined threshold value. When the matching score exceeds the predetermined threshold (YES in step S219), the process proceeds to step S205. When the matching score does not exceed the predetermined threshold (NO in step S219), the process proceeds to step S206.

As described above, in the sixth example embodiment, when the matching score of the selected one of the first position information and the second position information exceeds the predetermined threshold value, it is determined that the target person and the registered person are the same. This simplifies the matching score calculation processing as compared with the fourth and fifth example embodiments.

According to the sixth example embodiment, the information processing apparatus 1 that can simplify the processing is provided.

When the number of the plurality of pieces of position information is three or more, the process of step S208 may be modified to select one of the plurality of pieces of position information.

The apparatus or system described in the above example embodiment can also be configured as in the seventh example embodiment.

Seventh Example Embodiment

Figure 16:
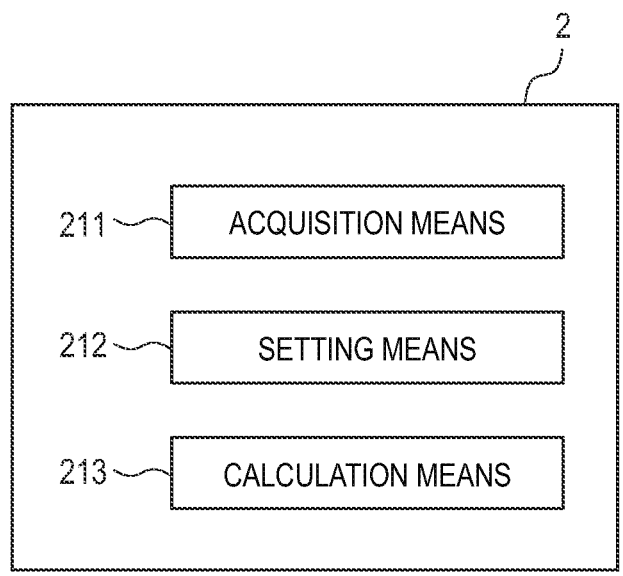
FIG. 16 is a functional block diagram of the information processing apparatus according to a seventh example embodiment.

FIG. 16 is a functional block diagram of an information processing system 2 according to the seventh example embodiment. The information processing system 2 includes an acquisition means 211, a setting means 212, and a calculation means 213. The acquisition means 211 acquires a feature point extracted from a biometric image including a pattern of a living body. The setting means 212 sets a first reference point and a second reference point corresponding to different positions of the biometric image. The calculation means 213 calculates first position information indicating a relative position of the first reference point with respect to the feature point and second position information indicating a relative position of the second reference point with respect to the feature point.

According to the seventh example embodiment, the information processing system 2 capable of performing feature extraction with higher accuracy is provided.

Modified Example Embodiments

This disclosure is not limited to the above-described example embodiments, and can be appropriately modified without departing from the gist of this disclosure. For example, examples in which some of the configurations of any of the example embodiments are added to another example embodiment or examples in which some of the configurations of any of the example embodiments are replaced with some of another example embodiments are also example embodiments of this disclosure.

In the example embodiment described above, when the biometric image is a fingerprint, it is desirable that at least one of the plurality of reference points is the center point of the fingerprint or delta of the fingerprint. Since the center point or delta exist in fingerprints of many people, and relatively significant features, the center point or delta are suitable for use as a reference for position.

The data format of the plurality of pieces of position information acquired in the above-described example embodiment is not particularly limited. This data format may be a format obtained by mixing distance information from a feature point to a reference point and direction information from the feature point to the reference point, or may be a format in which they are separated. Examples of a format in which distance information and direction information are mixed include a two-dimensional numeric vector, relative coordinates in a two-dimensional Cartesian coordinate system, and a complex number on a complex plane with a feature point as an origin. Examples of the format in which the distance information and the direction information are separated include polar coordinates in a two-dimensional polar coordinate system around a feature point, and a complex number in a polar format on a complex plane. Further, the distance information and the direction information may be acquired individually. That is, the first position information among the plurality of pieces of position information may include first direction information indicating a direction from the feature point to the first reference point, and first distance information indicating a distance from the feature point to the first reference point. Further, the second position information among the plurality of pieces of position information may include second direction information indicating a direction from the feature point to the second reference point, and second distance information indicating a distance from the feature point to the second reference point. Examples of the first direction information and the second direction information include an angle formed by a predetermined coordinate axis serving as a reference and a line connecting a feature point and a reference point. As described with reference to FIGS. 5 and 6, the factor of the error can be divided into a factor of the distance from the feature point to the reference point and a factor of the direction from the feature point to the reference point. Therefore, when the feature amount is separated into the distance information and the direction information, it is possible to set a determination condition in which the factor of this error is taken into account at the time of the matching, and the matching accuracy can be improved.

An example of criteria for selecting one of the first position information and the second position information in the sixth example embodiment is a distance from a feature point to a reference point. More specifically, the first position information may be selected when the reference point corresponding to the first position information is closer to the feature point, and the second position information may be selected when the reference point corresponding to the second position information is closer to the feature point. As described with reference to FIGS. 5 and 6, the closer the distance between the feature point and the reference point is, the smaller the influence of the setting error of the coordinate axis is.

A processing method in which a program for operating the configuration of the above-described example embodiments are recorded in a storage medium so as to realize the functions of the above-described example embodiment, the program stored in the storage medium is read out as a code, and executed in a computer is also included in the scope of each example embodiment. That is, a computer-readable storage medium is also included in the scope of each example embodiment. In addition, not only the storage medium storing the above-described program but also the program itself are included in each example embodiment. Further, one or more components included in the above example embodiment may be a circuit such as an application specific integrated circuit (ASIC) and a field programmable gate array (FPGA) configured to realize the functions of the components.

Examples of the storage medium include a floppy disk, a hard disk, an optical disk, a magneto-optical disk, a compact disk (CD)-ROM, a magnetic tape, a non-volatile memory card, and a ROM. In addition, the scope of each example embodiment includes not only a system in which a program stored in the storage medium is executed by itself but also a system in which a program is executed by operating on an operating system (OS) in cooperation with other software and functions of an expansion board.

The service implemented by the functions of the above-described example embodiments can also be provided to the user in the form of software as a service (Saas).

It should be noted that any of the above-described example embodiments is merely an example of an example embodiment for carrying out this disclosure, and the technical scope of this disclosure should not be interpreted as being limited by the example embodiments. That is, this disclosure can be implemented in various forms without departing from the technical idea or the main characteristics thereof.

The whole or part of the example embodiments disclosed above can be described as, but not limited to, the following supplementary notes.

(Supplementary Note 1)

An information processing system comprising:
an acquisition means for acquiring a feature point extracted from a biometric image including a pattern of a living body;
a setting means for setting a first reference point and a second reference point corresponding to different positions of the biometric image; and
a calculation means for calculating first position information indicating a relative position of the first reference point with respect to the feature point and second position information indicating a relative position of the second reference point with respect to the feature point.

(Supplementary Note 2)

The information processing system according to supplementary note 1 further comprising a control means for storing the first position information and the second position information in association with each other in a storage means.

(Supplementary Note 3)

The information processing system according to supplementary note 1 or 2 further comprising a matching means for performing biometric matching between a target person from which the biometric image is acquired and a registered person registered in advance based on at least one of the first position information and the second position information.

(Supplementary Note 4)

The information processing system according to supplementary note 3,
wherein the matching means determines that the target person and the registered person are the same person when a comparison result between the first position information of the target person and the first position information of the registered person satisfies a predetermined criteria and a comparison result between the second position information of the target person and the second position information of the registered person satisfies a predetermined criteria.

(Supplementary Note 5)

The information processing system according to supplementary note 3,
wherein the matching means determines that the target person and the registered person are the same person when at least one of a comparison result between the first position information of the target person and the first position information of the registered person and a comparison result between the second position information of the target person and the second position information of the registered person satisfies a predetermined criteria.

(Supplementary Note 6)

The information processing system according to supplementary note 3 further comprising a selection means for selecting one of the first position information and the second position information,
wherein the matching means determines that the target person and the registered person are the same person when a comparison result of selected one of the first position information and the second position information between the target person and the registered person satisfies a predetermined criteria.

(Supplementary Note 7)

The information processing system according to supplementary note 6, wherein the selection means selects the first position information when a distance from the feature point to the first reference point is less than a distance from the feature point to the second reference point, and selects the second position information when the distance from the feature point to the second reference point is less than the distance from the feature point to the first reference point.

(Supplementary Note 8)

The information processing system according to any one of supplementary notes 1 to 7,
wherein the biometric image is a fingerprint, and
wherein at least one of the first reference point and the second reference point is a core point of the fingerprint or a delta of the fingerprint.

(Supplementary Note 9)

The information processing system according to any one of supplementary notes 1 to 8,
wherein the first position information includes first direction information indicating a direction from the feature point to the first reference point and first distance information indicating a distance from the feature point to the first reference point, and wherein the second position information includes second direction information indicating a direction from the feature point to the second reference point and second distance information indicating a distance from the feature point to the second reference point.

(Supplementary Note 10)

An information processing method comprising:

acquiring a feature point extracted from a biometric image including a pattern of a living body;

setting a first reference point and a second reference point corresponding to different positions of the biometric image; and calculating first position information indicating a relative position of the first reference point with respect to the feature point and second position information indicating a relative position of the second reference point with respect to the feature point.

(Supplementary Note 11)

A storage medium storing a program for causing a computer to execute an information processing method comprising:

acquiring a feature point extracted from a biometric image including a pattern of a living body;

setting a first reference point and a second reference point corresponding to different positions of the biometric image; and calculating first position information indicating a relative position of the first reference point with respect to the feature point and second position information indicating a relative position of the second reference point with respect to the feature point.

REFERENCE SIGNS LIST 1 information processing apparatus
2 information processing system
101 processor
102 memory
103 communication I/F
104 input device
105 output device
111 acquisition unit
112 setting unit
113 calculation unit
114 control unit
115 matching unit
116 selection unit
211 acquisition means
212 setting means
213 calculation means
E1, E2, E3, and E4 error ranges
F1 and F2 feature points
P1 bifurcation point
P2 ridge ending point
P3 core point
P4 delta
R1, R2, and R3 reference points
V11, V12, V21, V22, VF1, and VF2 position information
C1, C2, C3, C4, C5, and C6 coordinate axes

What is claimed is:

1. An information processing system comprising:
a memory storing instructions; and
a processor configured to execute the instructions to:
acquire a feature point extracted from a biometric image including a pattern of a living body;
set a first reference point and a second reference point corresponding to different positions of the biometric image;
calculate first position information indicating a relative position of the first reference point with respect to the feature point and second position information indicating a relative position of the second reference point with respect to the feature point;
select one of the first position information and the second position information, wherein the first position information is selected when a distance from the feature point to the first reference point is less than a distance from the feature point to the second reference point, and the second position information is selected when the distance from the feature point to the second reference point is less than the distance from the feature point to the first reference point; and
perform biometric matching between a target person from which the biometric image is acquired and a registered person registered in advance, based on the selected one of the first position information and the second position information.

2. The information processing system according to claim 1, wherein the processor is further configured to execute the instructions to store the first position information and the second position information in association with each other in the memory.

3. The information processing system according to claim 1,
wherein the target person and the registered person are determined to be the same person when a comparison result of selected one of the first position information and the second position information between the target person and the registered person satisfies a predetermined criteria.

4. The information processing system according to claim 1,
wherein the biometric image is a fingerprint, and
wherein at least one of the first reference point and the second reference point is a core point of the fingerprint or a delta of the fingerprint.

5. The information processing system according to claim 1,
wherein the first position information includes first direction information indicating a direction from the feature point to the first reference point and first distance information indicating a distance from the feature point to the first reference point, and
wherein the second position information includes second direction information indicating a direction from the feature point to the second reference point and second distance information indicating a distance from the feature point to the second reference point.

6. An information processing method performed by a computer and comprising:
acquiring a feature point extracted from a biometric image including a pattern of a living body;
setting a first reference point and a second reference point corresponding to different positions of the biometric image;
calculating first position information indicating a relative position of the first reference point with respect to the feature point and second position information indicating a relative position of the second reference point with respect to the feature point;
selecting one of the first position information and the second position information, wherein the first position information is selected when a distance from the feature point to the first reference point is less than a distance from the feature point to the second reference point, and the second position information is selected when the distance from the feature point to the second reference point is less than the distance from the feature point to the first reference point; and performing biometric matching between a target person from which the biometric image is acquired and a registered person registered in advance, based on the selected one of the first position information and the second position information.

7. A non-transitory storage medium storing a program for causing a computer to execute an information processing method comprising:

acquiring a feature point extracted from a biometric image including a pattern of a living body;

setting a first reference point and a second reference point corresponding to different positions of the biometric image;

calculating first position information indicating a relative position of the first reference point with respect to the feature point and second position information indicating a relative position of the second reference point with respect to the feature point;

selecting one of the first position information and the second position information, wherein the first position information is selected when a distance from the feature point to the first reference point is less than a distance from the feature point to the second reference point, and the second position information is selected when the distance from the feature point to the second reference point is less than the distance from the feature point to the first reference point; and performing biometric matching between a target person from which the biometric image is acquired and a registered person registered in advance, based on the selected one of the first position information and the second position information.

* * * * *